Patented Sept. 15, 1942

2,295,565

UNITED STATES PATENT OFFICE 2,295,565

TRIAZINE DERIVATIVES

Gaetano F. D'Alelio and James W. Underwood, Pittsfield, Mass., assignors to General Electric Company, a corporation of New York No Drawing. Application August 30, 1941, Serial No. 409,026

14 Claims. (Cl. 260—248)

This invention relates to new chemical compounds and more particularly to triazine derivatives. The invention especially is concerned with the production of new and useful semicarbazido and thiosemicarbazido triazines.

The triazine derivatives of this invention may be represented graphically by the following general formula:

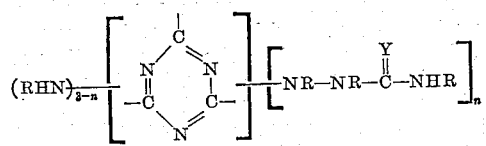

In the above formula $n$ represents an integer and is at least 1 and not more than 3, Y represents a member of the class consisting of oxygen and sulphur, and R represents a member of the class consisting of hydrogen and monovalent hydrocarbon radicals and halo-hydrocarbon radicals, numerous examples of which hereafter are given. From a consideration of the formula it will be seen that when $n$ is 3 there will be no amino (—NHR) groups attached to the triazine nucleus.

Illustrative examples of monovalent radicals that R in the above formula may represent are aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl, naphthyl, etc.); alkaryl (e. g., tolyl, xylyl, ethylphenyl, propylphenyl, isopropylphenyl, etc.); aralkyl (e. g., benzyl, phenylethyl, phenylpropyl, etc.); and their homologues, as well as those groups with one or more of their hydrogen atoms substituted by, for example, a halogen. Specific examples of halogeno-substituted hydrocarbon radicals are chlorphenyl, chlorcyclohexyl, chlorethyl, dichlorphenyl, ethyl chlorphenyl, phenyl chlorethyl, brompropyl, bromtolyl, etc. Preferably R is hydrogen.

The new triazine derivatives of this invention may be used as intermediates in the preparation of derivatievs thereof such as carbazic esters (hydrazino carboxylic esters), salts of carbazic acid (hydrazino carboxylic acid), etc., of the individual semicarbazido or thiosemicarbazido triazines. The chemical compounds of this invention are especially valuable in the preparation of synthetic resinous compositions. The hydrazino triazines are so strongly basic that it is difficult to cure the resinous aldehyde-reaction products thereof to the insoluble and infusible state. However, by converting the hydrazino triazines to the semicarbazido and thiosemicarbazido derivatives of this invention, the basicity disappears. Resinous aldehyde-reaction products therefore can be made that readily cure to the insoluble, infusible state. Thus, the compounds of this invention may be condensed with, for instance, aldehydes, including polymeric aldehydes and aldehyde-addition products, to yield condensation products of particular utility in the plastics and coating arts. Such condensation products are more fully described and are specifically claimed in our copending application Serial No. 409,023, filed concurrently herewith and assigned to the same assignee as the present invention.

Various methods may be employed to produce the chemical compounds of this invention. One suitable method comprises effecting reaction between a halogenated 1,3,5-triazine (that is, a triazine having a halogen atom attached directly to a carbon atom of the triazine nucleus) and a semicarbazide or a thiosemicarbazide corresponding to the semicarbazido or thiosemicarbazido substituent to be introduced into the triazine nucleus. This reaction may be represented by the following general equation:

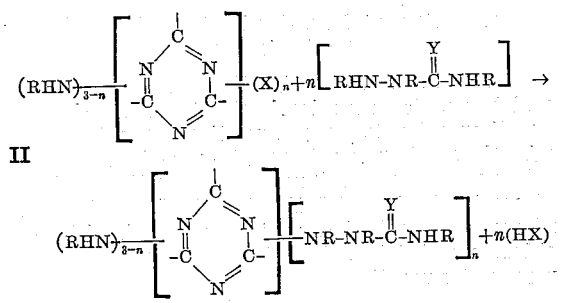

In the above equation X represents halogen, and $n$, R and Y have the same meanings as given above with reference to the general Formula I for the triazine derivatives of this invention. This reaction is best carried out in an anhydrous liquid medium, for example in ether, benzene, alcohol, etc.

It will be understood, of course, by those skilled in the art that the choice of the starting reactants and the mol ratios thereof depend upon the particular end-products desired. Illustrative examples of halogenated 1,3,5-triazines that may be used, depending upon the particular product sought, are listed below:

2-chloro 4,6-diamino 1,3,5-triazine
2-bromo 4,6-diamino 1,3,5-triazine
2,4-dichloro 6-amino 1,3,5-triazine
2,4-dibromo 6-amino 1,3,5-triazine
2,4,6-trichloro 1,3,5-triazine
2,4,6-tribromo 1,3,5-triazine
2-chloro 4,6-di-(ethylamino) 1,3,5-triazine
2,4-dichloro 6-phenylamino 1,3,5-triazine
2-chloro 4-ethylamino 6-amino 1,3,5-triazine
2-chloro 4-ethylamino 6-cyclohexylamino 1,3,5-triazine 2-chloro 4,6-di-(chlorphenylamino) 1,3,5-triazine
2-chloro 4-amino 6-naphthylamino 1,3,5-triazine
4-bromo 2,6-di-(chlorpropylamino) 1,3,5-triazine
2-chloro 4-bromo 6-amino 1,3,5-triazine
2-chloro 4,6-di-(chlornaphthylamino) 1,3,5-triazine Illustrative examples of the carbazides and thiocarbazides that may be employed, depending upon the particular semicarbazido or thiosemicarbazido substituent to be introduced into the nucleus, are shown below. The numbering system used is the same as that found in "Richter's Organic Chemistry," 2nd edition, vol. I, translated by Spielman, Blakiston's Son and Co., Philadelphia, Pa., 1919, namely,

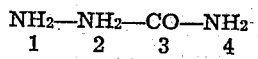

Semicarbazide
Thiosemicarbazide
4-methyl semicarbazide
2-methyl 4-ethyl semicarbazide
1,2-dimethyl semicarbazide
4-methyl thiosemicarbazide
2-methyl 4-allyl semicarbazide
1,4-diphenyl semicarbazide
2,4-diphenyl thiosemicarbazide
1,3,5-triethyl semicarbazide
1-phenyl 4-ethyl semicarbazide
1-ethyl 4-(beta-chlorallyl) thiosemicarbazide
1-chlorphenyl 4-tolyl semicarbazide In order that those skilled in the art better may understand how the present invention may be carried into effect, the following illustrative examples thereof are given:

EXAMPLE 1

*Preparation of 2-semicarbazido 4,6-diamino 1,3,5-triazine*

One mol of 2-chloro 4,6-diamino 1,3,5-triazine and two mols of semicarbazide in ether, alcohol or other suitable anhydrous liquid medium are stirred together for from 15 to 24 hours at or below room temperature. The reaction product (2-semicarbazido, 4,6-diamino 1,3,5-triazine) is filtered off, washed free of semicarbazide hydrochloride and dried. The following equation represents the reaction

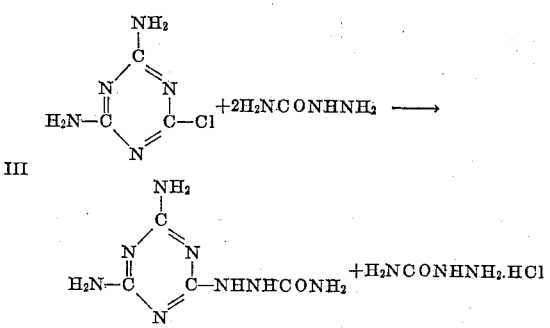

The above reaction likewise may be carried out in the presence of an acid acceptor, such as pyridine, quinoline, dimethyl aniline, calcium carbonate, etc., instead of the molar excess of the semicarbazide.

EXAMPLE 2

*Preparation of 2,4,6-tri-semicarbazido 1,3,5-triazine*

The same procedure is followed as described under Example 1 with the exception that the halogenated triazine is 2,4,6-trichloro 1,3,5-triazine and the semicarbazide is employed in an amount corresponding to 6 mols semicarbazide per mol of the said halogenated triazine. The reaction may be represented by the following equation:

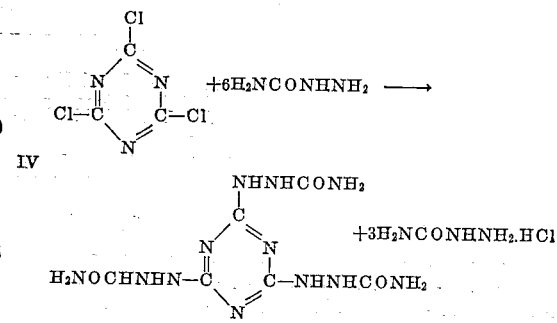

When it is desired to produce only the mono-semicarbazido or the mono-(thiosemicarbazido) triazine derivatives, then still another method may be employed. Specifically the hydrazino derivatives of the 1,3,5-triazine are caused to react with cyanates, thiocyanates, isocyanates or isothiocyanates to yield the corresponding semicarbazido- or thiosemicarbazido-substituted products. For example, a hydrazino 1,3,5-triazine is caused to react in aqueous solution under carefully controlled temperature conditions with a cyanate, isocyanate, thiocyanate or isothiocyanate, the reaction proceeding as represented by the following general equation:

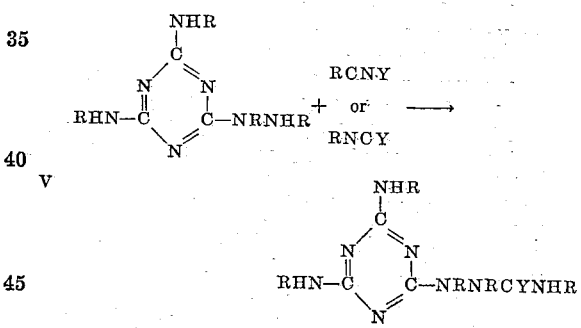

In the above equation R and Y have the same meaning as above given with reference to Formula I for the triazine derivatives of this invention.

When R in the formulas RNY and RNCY represents hydrogen, the acids corresponding to the formulas HCNY and HNCY may be formed in situ by using an alkali-metal salt, an alkaline-earth salt or an ammonium salt of cyanic, isocyanic, thiocyanic or isothiocyanic acids and by carrying out the reaction either in the presence of an inorganic acid, e. g., hydrochloric, hydrobromic, sulfuric, etc., or by using a preformed inorganic acid salt of the hydrazino triazine as a starting reactant, e. g., a monohydrochloride or monohydrobromide thereof. Sodium, potassium, calcium and magnesium cyanates, isocyanates, thiocyanates and isothiocyanates are more specific examples of salts that may be used as starting reactants. More specific examples of normal and isocyanates that may be employed when R in the formulas RCNY and RNCY is other than hydrogen are the methyl, ethyl, propyl, isopropyl, butyl, amyl, allyl, phenyl, chlorphenyl, etc., cyanates, isocyanates, thiocyanates and isothiocyanates. More specific examples of aminotriazines that may be used in preparing mono-semicarbazido diamino triazines or mono-(thiosemicarbazido) diamino triazines by the above-described method are:

2-hydrazino 4,6-di-(ethylamino) 1,3,5-triazine
2-ethylhydrazino 4,6-di-(phenylamino) 1,3,5-triazine
2,4,6-tri-(methylhydrazino) 1,3,5-triazine
2,4,6-tri-(phenylhydrazino) 1,3,5-triazine
2-amino 4-ethylamino 6-phenylhydrazino 1,3,5-triazine
2-amino 4-methylamino 6-ethylhydrazino 1,3,5-triazine
2,4,6-tri-(propylhydrazino) 1,3,5-triazine
2,4-diamino 6-hydrazino 1,3,5-triazine
(2-hydrazino 4,6-diamino 1,3,5-triazine)
2,4-di-hydrazino 6-amino 1,3,5-triazine
2,4,6-trihydrazino 1,3,5-triazine The following example illustrates the production of 2-semicarbazido 4,6-diamino 1,3,5-triazine by the above-described method. All parts are by weight.

Example 3

Eighty-nine parts of 2-hydrazino 4,6-diamino 1,3,5-triazine monohydrochloride were dissolved in 500 parts distilled water, after which the solution was cooled to 0° C. To the cooled solution was added 60 parts of potassium cyanate in 150 parts water. The reaction mixture was kept at a low temperature of the order of 0° to 5° C. for several hours. Finally the mass was heated on a water bath for 30 minutes. The reaction product comprising 2-semicarbazido 4,6-diamino 1,3,5-triazine was filtered off, washed free of potassium chloride and dried.

From the foregoing description it will be seen that the present invention provides new and useful semicarbazido and thiosemicarbazido triazines, examples of which are the tri-semicarbazido 1,3,5-triazines, the tri-(thiosemicarbazido) 1,3,5-triazines, the monoamino (—NHR) di-semicarbazido 1,3,5-triazines, the monoamino (—NHR) di-(thiosemicarbazido) 1,3,5-triazines, the diamino [(—NHR)$_2$] monosemicarbazido 1,3,5-triazines and the diamino [(—NHR)$_2$] mono-(thiosemicarbazido) 1,3,5-triazines. Other and more specific examples of these new compounds are shown below:

VI

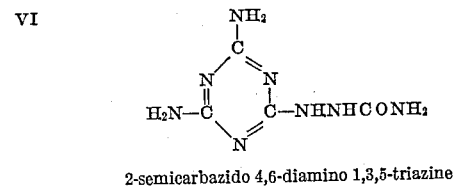

2-semicarbazido 4,6-diamino 1,3,5-triazine

VII

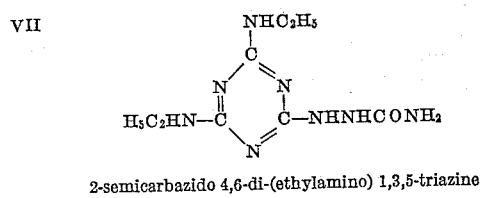

2-semicarbazido 4,6-di-(ethylamino) 1,3,5-triazine

VIII

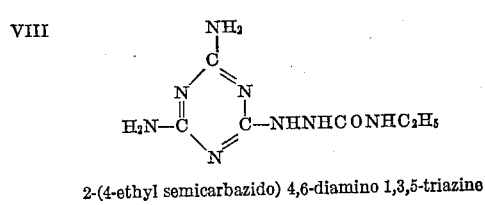

2-(4-ethyl semicarbazido) 4,6-diamino 1,3,5-triazine

IX

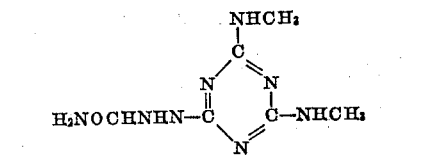

4-semicarbazido 2,6-di-(methylamino) 1,3,5-triazine

X

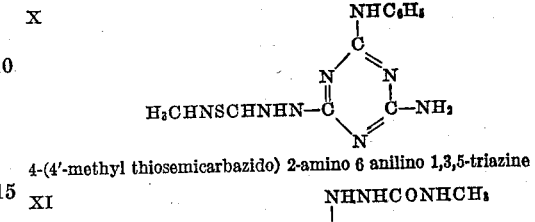

4-(4'-methyl thiosemicarbazido) 2-amino 6 anilino 1,3,5-triazine

XI

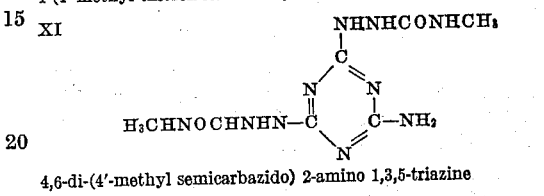

4,6-di-(4'-methyl semicarbazido) 2-amino 1,3,5-triazine

XII

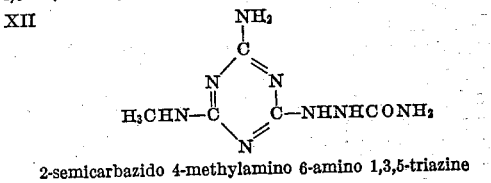

2-semicarbazido 4-methylamino 6-amino 1,3,5-triazine

XIII

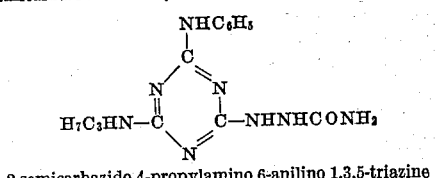

2-semicarbazido 4-propylamino 6-anilino 1,3,5-triazine

XIV

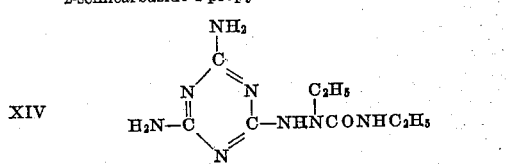

2-(2',4'-diethyl semicarbazido) 4,6-diamino 1,3,5-triazine

XV

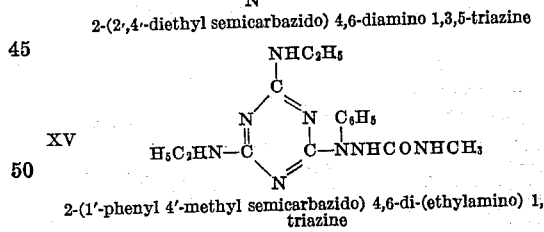

2-(1'-phenyl 4'-methyl semicarbazido) 4,6-di-(ethylamino) 1,3,5-triazine

XVI

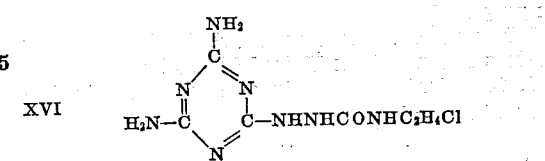

2-[4'-(beta-chlorethyl) semicarbazido] 4,6-diamino 1,3,5-triazine

XVII

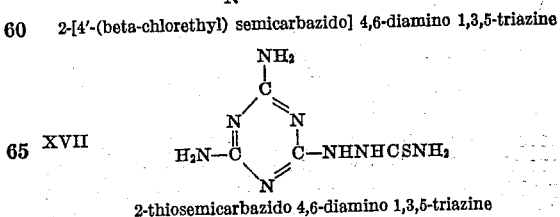

2-thiosemicarbazido 4,6-diamino 1,3,5-triazine

XVIII

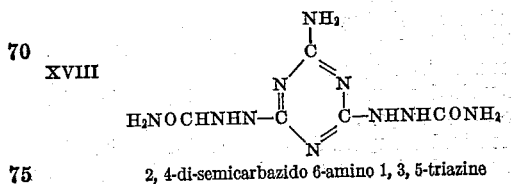

2,4-di-semicarbazido 6-amino 1,3,5-triazine

XIX 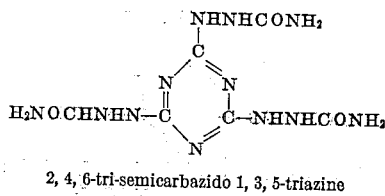

2,4,6-tri-semicarbazido 1,3,5-triazine

XX 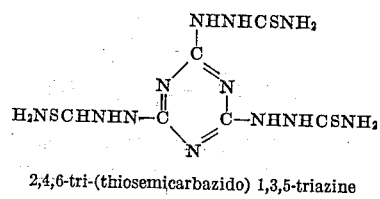

2,4,6-tri-(thiosemicarbazido) 1,3,5-triazine

Other examples are listed below without their formulas, since their formulas will be readily apparent to those skilled in the art from the formulas of the above-mentioned compounds:

2-(2'-ethyl thiosemicarbazido) 4,6-di-anilino 1,3,5-triazine 2-thiosemicarbazido 4,6-di-(ethylamino) 1,3,5-triazine 2-(1'-ethyl 4'-phenyl thiosemicarbazido) 4,6-diamino 1,3,5-triazine 2-(2',4'-diethyl thiosemicarbazido) 4,6-diamino 1,3,5-triazine 2-thiosemicarbazido 4-ethylamino 6-phenylamino 1,3,5-triazine 2-semicarbazido 4,6-di-(propylamino) 1,3,5-triazine 2-semicarbazido 4,6-di-(cyclohexylamino) 1,3,5-triazine 2-semicarbazido 4,6-di-(chloranilino) 1,3,5-triazine 2-semicarbazido 4,6-di-(chlorethylamino) 1,3,5-triazine 2,4-di-(thiosemicarbazido) 6-amino 1,3,5-triazine 2-semicarbazido 4-thiosemicarbazido 6-amino 1,3,5-triazine 2-thiosemicarbazido 4,6-di-(ethylamino) 1,3,5-triazine In a manner similar to that described above with particular reference to the production of semicarbazido and thiosemicarbazido 1,3,5 or symmetrical triazines, the corresponding semicarbazido and thiosemicarbazido 1,2,4 or asymmetrical triazines and the semicarbazido and thiosemicarbazido 1,2,3 or vicinal triazines may be prepared.

What we claim as new and desire to secure by Letters Patent of the United States is:

1. Chemical compounds corresponding to the general formula

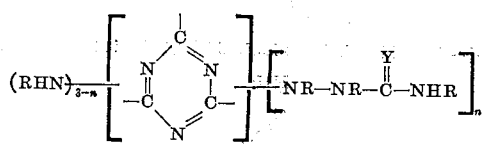

where $n$ is an integer and is at least 1 and not more than 3, R is a member of the class consisting of hydrogen and monovalent hydrocarbon and halo-hydrocarbon radicals, and Y is a member of the class consisting of oxygen and sulfur.

2. Chemical compounds as in claim 1 wherein R represents hydrogen.

3. Chemical compounds as in claim 1 wherein Y represents oxygen.

4. Chemical compounds as in claim 1 wherein R represents hydrogen and Y represents oxygen.

5. Chemical compounds as in claim 1 wherein R represents hydrogen and $n$ is 1.

6. 2,4,6-tri-semicarbazido 1,3,5-triazine.

7. 2-semicarbazido 4,6-diamino 1,3,5-triazine.

8. 2-thiosemicarbazido 4,6-diamino 1,3,5-triazine.

9. The method of preparing chemical compounds corresponding to the general formula

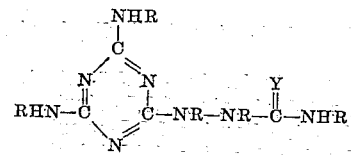

where Y represents a member of the class consisting of oxygen and sulfur and R represents a member of the class consisting of hydrogen and monovalent hydrocarbon and halo-hydrocarbon radicals, said method comprising effecting reaction between (1) a compound corresponding to the general formula

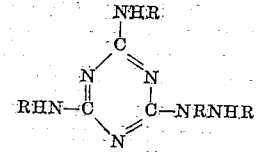

where R has the meaning above given, and (2) a compound selected from the class of compounds corresponding to the general formulas RCNY and RNCY where R and Y have the meanings above given.

10. A method as in claim 9 wherein R represents hydrogen and the reactant of the class consisting of HCNY and HNCY is formed in situ by using a suitable member of the class consisting of the alkali-metal salts, the alkaline-earth salts and the ammonium salts of cyanic, isocyanic, thiocyanic and isothiocyanic acids and by carrying out the reaction in the presence of a mineral acid.

11. A method as in claim 9 wherein R represents hydrogen and the reactant of the class consisting of HCNY and HNCY is formed in situ by using a suitable member of the class consisting of the alkali-metal salts, the alkaline-earth salts and the ammonium salts of cyanic, isocyanic, thiocyanic and isothiocyanic acids and by using an inorganic acid mono salt of the hydrazino diamino triazine as the starting reactant.

12. The method of preparing 2-semicarbazido 4,6-diamino 1,3,5-triazine which comprises effecting reaction between an inorganic acid mono salt of 2-hydrazino 4,6-diamino 1,3,5-triazine and an alkali-metal cyanate.

13. The method of preparing 2-thiosemicarbazido 4,6-diamino 1,3,5-triazine which comprises effecting reaction between an inorganic acid mono salt of 2-hydrazino 4,6-diamino 1,3,5-triazine and an alkali-metal isothiocyanate.

14. The method of preparing 2-semicarbazido 4,6-diamino 1,3,5-triazine which comprises effecting reaction between 2-hydrazino 4,6-diamino 1,3,5-triazine monohydrochloride and potassium cyanate.

GAETANO F. D'ALELIO.
JAMES W. UNDERWOOD.

CERTIFICATE OF CORRECTION.

Patent No. 2,295,565.　　　　　　　　　　　　September 15, 1942.

GAETANO F. D'ALELIO, ET AL.

It is hereby certified that error appears in the printed specification of the above numbered patent requiring correction as follows: Page 2, second column, line 52, for "RNY" read --RCNY--; page 3, first column, line 75, for "2-(4-ethyl" read --2-(4'-ethyl--; and that the said Letters Patent should be read with this correction therein that the same may conform to the record of the case in the Patent Office.

Signed and sealed this 27th day of October, A. D. 1942.

(Seal)

Henry Van Arsdale,
Acting Commissioner of Patents.